(12) United States Patent
Coutancier et al.

(10) Patent No.: US 7,692,929 B2
(45) Date of Patent: Apr. 6, 2010

(54) INTERFACE CONNECTION DEVICE FOR CONNECTING A MAINBOARD TO A MEMORY CARD HAVING TWO SERIES OF MEMORY MODULES

(75) Inventors: Lionel Coutancier, Croisilles (FR); Elodie Marquina, Paris (FR); Jean-Jacques Pairault, Boulogne Billancourt (FR)

(73) Assignee: Bull SAS

( * ) Notice: Subject to any disclaimer, the term of this patent is extended or adjusted under 35 U.S.C. 154(b) by 0 days.

(21) Appl. No.: 11/364,554

(22) Filed: Mar. 1, 2006

(65) Prior Publication Data
US 2006/0198114 A1 Sep. 7, 2006

(30) Foreign Application Priority Data
Mar. 4, 2005 (FR) .................................. 05 02200

(51) Int. Cl.
*H05K 7/00* (2006.01)
(52) U.S. Cl. ........................................................ 361/760
(58) Field of Classification Search ................. 361/736, 361/796, 784, 808, 752, 788, 760, 761; 257/784
See application file for complete search history.

(56) References Cited

U.S. PATENT DOCUMENTS 6,658,509 B1 12/2003 Bonella et al.
6,726,505 B2 * 4/2004 Cermak et al. .............. 439/567
6,868,467 B2 * 3/2005 Timmins et al. ............ 710/301
2004/0111546 A1 6/2004 Dhong et al.
2004/0123016 A1 6/2004 Doblar et al.
2005/0138348 A1 6/2005 Bolay et al.

OTHER PUBLICATIONS

FA661388FR0502200 French Search Report (Copy Attached).

* cited by examiner

*Primary Examiner*—Jinhee J Lee
*Assistant Examiner*—Abiy Getachew
(74) *Attorney, Agent, or Firm*—Russell W. Guenthner (57) ABSTRACT

A connection arrangement for a mainboard having at least one memory card connected to a processor and two series of FBD memory modules connected to respective FBD channels in the memory card by means of FBD connectors using a daisy-chain arrangement. Each channel of the memory card is connected to a linking module to another card the linking module receives two separate FBD channels and includes a FBD type connector with two series of electrical contact pins respectively connected to two paired channels of the memory card. The FBD connector is mounted on the back of the memory card so as to be associated with a connection interface providing the connection to a mainboard. The mainboard is also equipped with a connector of the FBD type designed for inter-card connection.

26 Claims, 4 Drawing Sheets

INTERFACE CONNECTION DEVICE FOR CONNECTING A MAINBOARD TO A MEMORY CARD HAVING TWO SERIES OF MEMORY MODULES

BACKGROUND OF THE INVENTION

1 Field of the Invention

This present invention relates to the area of memory card connection and optimization of the use of mainboard area. The invention relates more particularly to a interface connection device used to connect a mainboard to a memory card of the type housing two series of memory modules. In what follows, mainboard refers to any board having at least one processor and intended to be connected to one or more other cards (secondary cards) or indeed to memories. For example, the mainboard can be a motherboard of a CPU.

The use of memory modules of the DIMM type (dual in line memory module) in computer equipment is known. These memory modules generally take the form of 64-bit memory barrettes, equipped with 84 connecting pins on each side, making 168 DTRS in all. A "daisy chain" type bus topology is often used to establish the connection between the memory modules, in particular between modules of the FBD type (fully-buffered DIMMs; JEDEC JC-45.4). The expression "daisy chain" is used to indicate a method of connection between modules or between machines which use a single logic line to connect the modules to each other; with the bus being terminated at each end by a terminator, and only one module is able to emit at a time.

The FBD modules are connected continuously in a "daisy chain" on an FB-DIMM channel. It is possible to put up to 8 DIMM modules on any one channel. It is also beneficial to use the channels in pairs, for several reasons including the following:

to increase the accessible memory capacity, so that one sometimes accesses one channel and sometimes the other according to the memory zone targeted, so that it is possible to exceed 8 barrettes. Although there is no categorical imperative here in this regard, performance or availability considerations favour configurations where the barrettes are divided equitably between the 2 channels;

to increase the memory speed and to be able to launch memory access to one channel while one is launching another on the other channel. In this case, there will generally be the same number of barrettes on each channel so as to balance the load between the 2 channels, thereby extracting the best performance. A conventional use of this arrangement is memory interlacing, which is used to execute memory accesses in rapid succession to successive addresses. The even addresses are then served by one channel and the odd addresses by the other (in this case, the 2 channels are necessarily connected to an identical number of barrettes, since it would make no sense to have only even (or odd) addresses in one given memory zone);

to increase the width (number of bits) of the memory word accessible in a single operation from the FB-DIMM barrettes (the 2 channels, used simultaneously, then give one word which is twice as wide). In this case, the 2 channels must necessarily be put in relation with an identical number of barrettes; otherwise one part of the memory would be composed of incomplete memory words.

It is therefore observed that very often, in the case of two channels, these will be made up from the same number of memory barrettes, and that the composition of the memory configuration takes the form of a progressive and simultaneous accretion of the two channels. However, allowing for this additional constraint creates a certain number of difficulties. In fact, whatever the number of memory barrettes specified as a maximum and finally installed on each channel, the following technical problems arise in a computer unit:

accessibility of the memories; the FB-DIMMs are of the "hot plug" type (capable of being connected or disconnected without switching off the remainder of the system), and it is possible to add memory barrettes beginning with slot 1 up to slot 8. It is likewise possible to remove them, beginning at the end of the "daisy chain";

optimisation of the CPU board area. With a connector having a length of 155 mm and a pitch of 10.5 mm (0.41 inches), the memories are quite bulky and, for example, 16 FB-DIMM modules represent a board area of 160×180 mm (in one row) or 320×90 mm (in two rows);

difficulty in making best use of the volume inside the 2U or 3U computer unit (1U is 44.45 mm according to standard EIA-310-D, allowing the referencing and vertical positioning of the computer equipment in a rack of the high-density type in data centres, network rooms and cabling cabinets);

high cost of the cards providing a configuration with many memories;

cooling that requires orientation of the memory barrettes which must be compatible with the flow of air necessary to cool the whole unit.

In existing designs, the FBD type memory modules are placed on the mainboard containing the processor. A disadvantage of this type of arrangement is that the area occupied on the processor board by the FB-DIMMs is very significant. Moreover, compactness is not optimised, since the volume generally available above the mainboard is not used. It should also be noted that, regardless of the number of memory barrettes installed, the cost of the mainboard (printed circuit area+FBD) is that of a configuration with 8 DIMM modules per channel.

Furthermore, since the channels are used in pairs, the simple fact of dividing the memories in two by the use of secondary cards (daughter cards), positioned horizontally or vertically, does not result in both compactness and accessibility to the memory modules. An additional drawback of this type of arrangement is its poor growth flexibility if it is desired to add memory capacity.

SUMMARY OF THE INVENTION

The present invention is intended to circumvent one or more of the disadvantages of previous designs, by providing a motherboard arrangement that allows the manner of installing FBD memory cards to be improved.

To this end, the invention concerns a connection arrangement for a mainboard having at least one processor, allowing the connection of at least one memory card of the type with a series of memory modules to the said mainboard, where the mainboard is equipped with at least one pair of channels connected to the processor, and is characterized in that each channel of a pair is connected to an FBD external linking connector, and the external linking connector having two distinct series of electrical contact pins respectively connected to the two output channels of a pair of channels provided on the mainboard.

According to another feature of the invention, the external linking connector is designed to be associated with a connection interface providing the connection to a memory card.

According to another feature, the arrangement includes a connection interface inserted in the said connector, where the interface includes:

two plugs of the FBD type, compatible with the said external linking connector, each fitted with two series of electrical contact pins, the first of these plugs constituting a connection resource that is capable of being connected to two output channels of the mainboard, and a second of these plugs constituting a connection resource that is capable of being connected to two input channels of a memory card of the type with a series of FBD memory modules; and respective internal links to connect the first plug to the second plug in the said interface.

According to another feature, the arrangement includes connectors of the FBD type provided to connect FBD memory modules to the mainboard, these FDB type connectors being connected in series between the processor on the mainboard and the external linking connector, the connection being made for each series by simple links from one of the channels.

Another objective of the invention is to propose a memory card that is used to equip a mainboard, in order to circumvent one or more of the disadvantages of previous designs.

To this end, the invention concerns a memory card intended to equip a mainboard that is fitted with at least one pair of channels connected to a processor, of the type with two series of FBD memory modules connected to respective channels of the FBD type by means of connectors of the FBD type used to connect FBD memory modules, characterized in that each channel of the memory card is connected to a linking module to another card, the linking module receiving in all two distinct channels of the FBD type and including a connector of the FBD type having two distinct series of electrical contact pins respectively connected to two paired channels of the memory card, the connector of the linking module being capable of being associated with a connection interface providing the connection to the mainboard.

According to another feature, the memory card includes two opposite faces, one of which supports connectors of the FBD type, to connect FBD memory modules, and the other supports the connector of the linking module, with the linking module having conductor elements to connect the channels of the memory card to the connector of the linking module.

According to another feature, each channel of the FBD type is connected to connectors of the FBD type by a daisy-chain arrangement, each of the channels having one end connected to the said linking module.

According to another feature, the connector of the linking module is used to insert a connection interface including:

two plugs of the FBD type that are compatible with the said connector of the linking module, each fitted with two series of electrical contact pins, a first of these plugs constituting a connection resource that is capable of being connected to two output channels of a mainboard, and a second of these plugs constituting a connection resource that is capable of being connected to two input channels of the memory card; and respective internal links to connect the first plug to the second plug in the said interface.

Another objective of the invention is to propose a connection interface that is used to connect a mainboard to a memory card and which is designed for the constraints of storage systems with channels combined into pairs, with the connection method aiming to facilitate the constitution of a flexible memory configuration, by progressive and simultaneous accretion of the two channels.

To this end, the invention concerns a connection interface, intended for a computer unit, used to connect a mainboard that has at least one processor to a memory card of the type with a series of memory modules, characterized in that it includes:

two connecting plugs of the FBD type, each fitted with two series of electrical contact pins, each of the plugs being capable of being inserted into a two-way connector of the FBD type, the first of these plugs constituting a connection resource that is capable of being connected to two channels of a mainboard, and the second of these plugs constituting a connection resource that is capable of being connected to two channels of a memory card of the type with a series of memory modules divided between at least two channels; and respective internal links connecting the first plug to the second plug in the said interface.

Thus, the invention advantageously proposes to use a particular arrangement with FB-DIMM connectors paired by means of a connection interface, the first connector being uses as a double input in connection with a mainboard, and the second connector being uses as double output in connection with a memory card. This type of connection interface is used to add one or more optional daughter cards to a motherboard without difficulty.

An additional objective of the invention is to propose a connection interface that provides increased compactness while also providing easy access to the memory modules.

To this end, the connection interface includes at least one intermediate adapter element attached to the first plug and to the second plug and extending over a sufficiently large area to provide support for the memory card and to keep the latter away from the mainboard, while being matched to the lengths of the internal links which connect the first plug to the second plug.

According to another feature, the intermediate adapter element is an extension card of a mainboard and the internal links are printed circuit tracks.

According to another feature, the two plugs are identical and placed on either side of a median plane of the connection interface.

According to another feature, the two plugs are co-planar and oriented in opposite directions to allow the connection of memory cards positioned parallel to the median plane.

According to another feature, the intermediate adapter element includes conducting lines connecting the two plugs.

According to another feature, the intermediate adapter element is rendered attached to a mainboard.

According to another feature, the intermediate adapter element is rendered attached to a memory card of the type with a series of FBD memory modules divided between at least two channels.

BRIEF DESCRIPTION OF THE DRAWINGS

The invention, with its characteristics and advantages, will be understood more clearly on reading the following description, provided with reference to the appended drawings in which.

DESCRIPTION OF THE PREFERRED EMBODIMENTS

The invention proposes a connection interface which is designed to connect one or more multiline input-output memory cards (3, 31, 32) in parallel, whose respective memory modules (2) must be connected by means of a multiline bus, in a "daisy chain" bus topology, to each FB-DIMM channel (40, 41). In a manner that is already known, it is possible to put up to eight DIMM memory modules on one channel, where each module (2) comes, for example, in the form of a memory barrette.

Figure 6A:
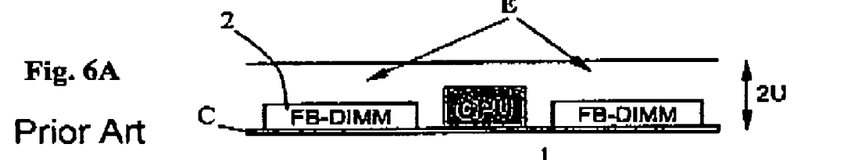
Figure 6B:
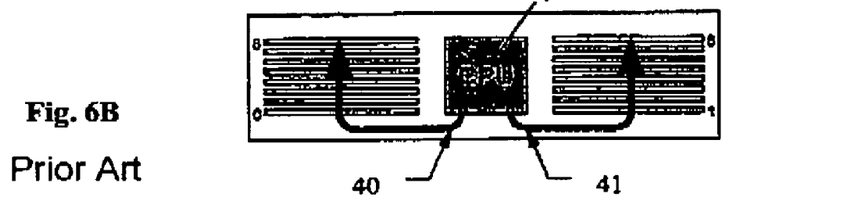

The inventors have observed that there exists a need to re-locate the memory modules (2) on the mainboard (C), in particular so as to minimise the area occupied on the card (C), which generally already has a processor (1), a CPU or similar processing unit, communicating via two channels (40, 41) or several pairs of channels. In fact, as shown in FIGS. 6A and 6B, the cost of a motherboard or mainboard fitted with these sixteen memory modules (2) is high, while the desired configuration can necessitate a more restricted number of memory modules (2). It would therefore be preferable to provide additional memory modules (2) by means of daughter cards. However there are no known solutions that use FB-DIMM memories on daughter cards.

Figure 7A:
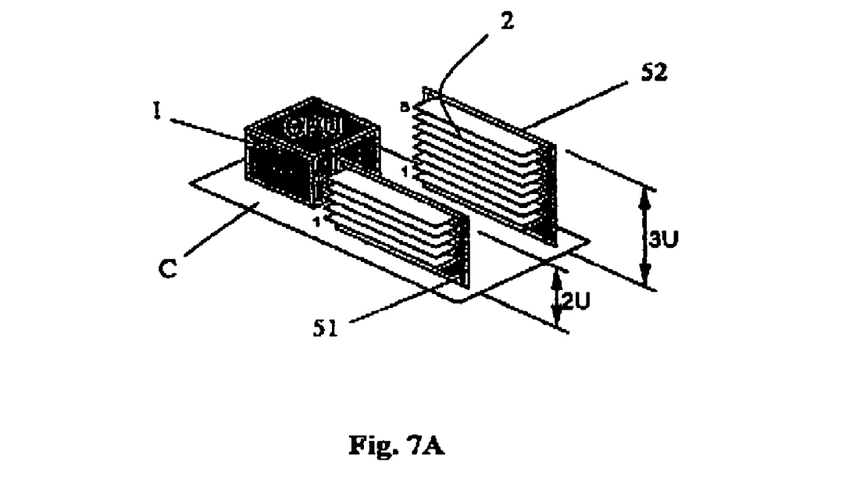
FIGS. 7A, 7B and 7C illustrate connection options between a motherboard and one or more daughter cards, where these options show all of the disadvantages which would be avoided if the connection type of the invention were to be used.

Anyone in this domain who is seeking to improve the arrangement of the modules (2) might well be tempted to install daughter cards (51, 52) on the mainboard (C), inserting one vertical daughter card (51, 52) per channel, as illustrated in FIG. 7A. For a unit with a height of the order of 9 cm (~2U), the card (C) includes up to 5 memories, or 8 for a 3U unit (133.35 mm). However, the person concerned is not encouraged to adopt to this type of solution, firstly because of the lack of compactness (a clear space must be left between the daughter cards in order to be able to reach the FB-DIMMs) and secondly because of poor flexibility when a number of channels have to be fitted to the mainboard. It is then necessary to use as many memory cards (51, 52) as there are FB-DIMM channels, even if each card (51, 52) has only one barrette. Even by envisaging other arrangements of the daughter cards, it is realised that the problem of reducing the occupation of the mainboard (C) in a satisfactory way has so far remained unsolved.

Figure 7B:
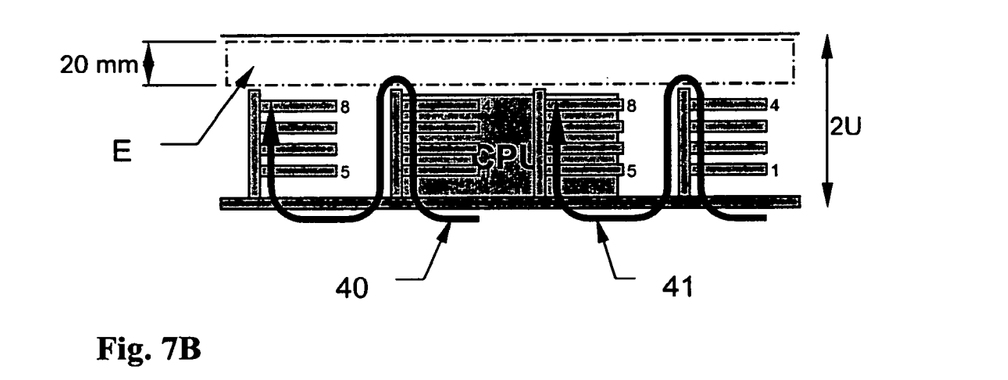
Figure 7C:
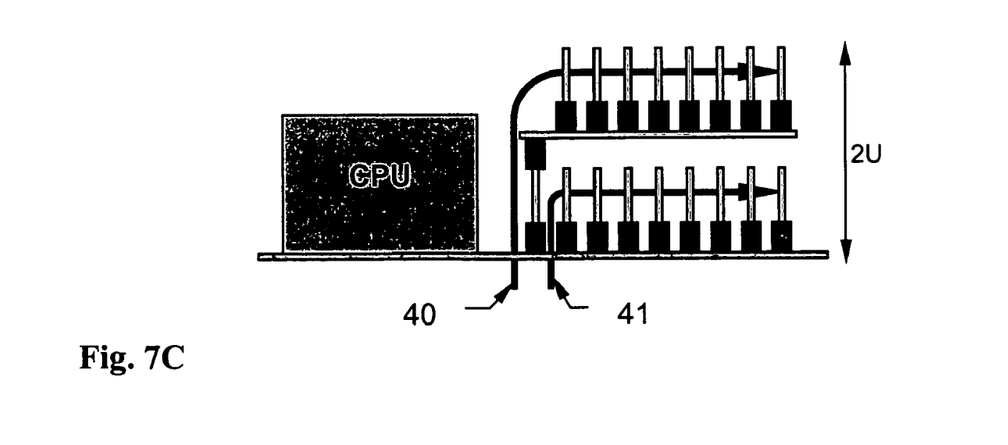

The complementary examples of such arrangements, shown in FIGS. 7B and 7C, are arrangements capable of being thought up by a professional engineer by the adaptation of previous known designs. In the example of FIG. 7B, with two daughter cards added per channel, for each FBD channel, the first four and the last four barrettes are on two daughter cards (the cards containing barrettes 5 to 8 are optional). One disadvantage of this type of daughter card addition is the poor occupation of the mainboard (C)—for the two channels (which form a pair) one needs four daughter cards plus three intervals in order to access all of the connectors and memory modules of the FBD type. Moreover, the daughter card which includes four barrettes (on the right in FIG. 7B) must have twice as many logic layers in order to allow the FBD channel to go from barrette 4 to barrette 5. Moreover if one wants to have identical memory cards, then half of the logic layers remain unused on the memory card with barrettes 5 to 8. Finally, it is also necessary to note the unused space (E) above the memory cards. Even on a shelf with a height of less than 10 mm (2U, for example), there is significant unused space (E) above the memory cards.

In the example of FIG. 7C, the memories of the first channel (41) are on the CPU card, and those of the second channel (40) on a daughter card placed above it. With this arrangement of the daughter card in a "mezzanine" position, the FB-DIMM modules of the first channel (41) are inaccessible, because they are covered by the superimposed daughter card. Moreover, it is essential to have the daughter memory card even if, in practice, there is only one FBD memory module on each channel (40, 41), since the channels are paired.

Figure 1:
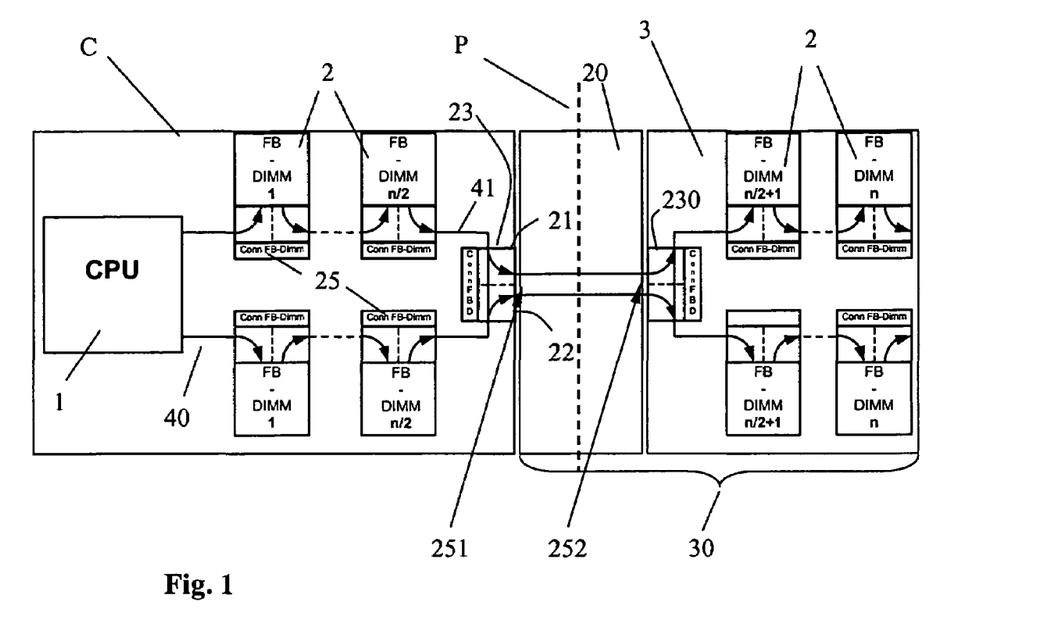
FIG. 1 is a diagrammatic view of the connection between a motherboard and a memory card, effected by means of a connection arrangement according to the invention, FIGS. 2A and 2B respectively show a view in perspective and a view in section of a connection between a mainboard and a memory card effected by a connection arrangement according to the invention, FIGS. 3A and 3B respectively show a view in perspective and a view in section of the connections between a mainboard and two memory cards effected by connection devices according to the invention, FIGS. 4 and 5 respectively show a view in section of a connection between a mainboard and a memory card effected by a connection device according to the invention, FIGS. 6A and 6B respectively show a side view and a top view of a motherboard incorporating all of the memory modules according to existing designs.
Figure 8:
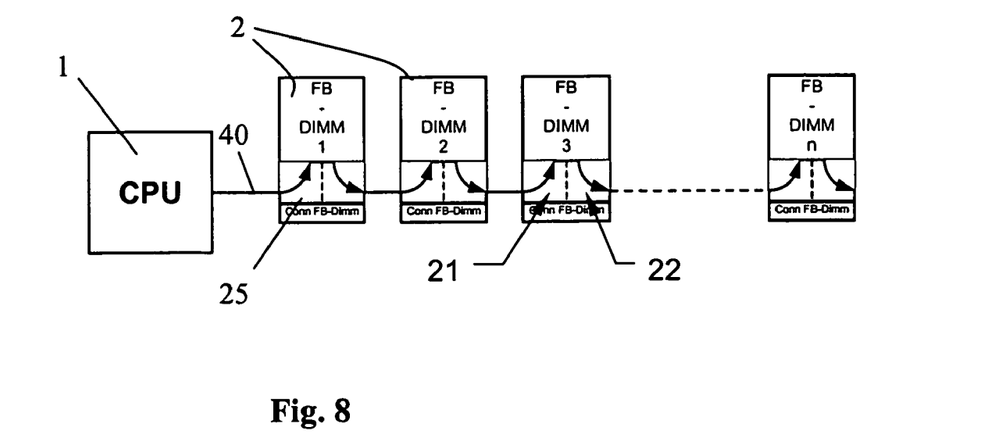
FIG. 8 shows the connection method of the daisy-chain type effected between the memory modules by means of simple connections according to the design of the invention (in contrast to the double connections of previous designs).

Referring to FIG. 1, the connection interface of the invention is particularly suitable to establish connections between a mainboard (C) and a memory card (3, 31, 32) in a unit with restricted dimensions. Because the memory card (3, 31, 32) must be of the type with a series of memory modules (2), including, advantageously, two series of these modules (2), the interface is advantageously fitted with two connecting plugs (251, 252) of the FBD type, each fitted with two distinct series of electrical contact pins. This interface corresponds to the FBD standard, with the first of these plugs (251) constituting a connection resource capable of connecting two output channels (40, 41) of the mainboard (C), and the second of these plugs (252) constituting a connection resource capable of connecting two input channels of a memory card (3, 31, 32) of the type with a series of FBD memory modules divided between at least two channels. Each of the plugs (251, 252) can correspond to the plug located on an FBD memory module (2). The inventors have cleverly taken advantage of the fact that the FB-DIMM connector designed to function in "daisy chain" is symmetrical—half of the contacts are provided to receive the bus ("in" side), the other half being designed to route the bus to the next module or barrette ("out" side), as shown in particular for the FBD connectors (25) of FIGS. 1 and 8. Since such a connector (23, 230, 25) is symmetrical, two FB-DIMM channels (40, 41) can enter (or exit) on its two halves. In other words, it is possible to use an "in-out" connector as an "in-in" connector or as an "out-out" connector.

In the method of implementation of FIG. 1, each of the two series of electrical contact pins provided in the plugs (251, 252) of the connection interface allows it to adapt indifferently to an output of a transmission channel or to an input of a transmission channel. As illustrated in FIGS. 1, 2, 3A and 3B, the first plug (251) constitutes a connection resource that is capable of being connected to two channels of a mainboard (C), and the second plug (252) constitutes a connection resource that is capable of being connected to two channels of a memory card (3, 31, 32) of the type with two series of memory modules (2). The series of FB-DIMM modules are divided between the respective channels of the memory card (3, 31, 32).

As shown in FIG. 1, respective internal links are provided in the connection interface in order to connect the first plug (251) to the second plug (252). These internal links take the form of printed circuit tracks, for example. The connection interface can therefore be used, with a memory card (3), to form an optional part (30) capable of being connected to the mainboard (C). In a preferred method of implementation of the invention, the connection interface includes at least one intermediate adapter element (20) attached to the first plug (251) and to the second plug (252). This intermediate adapter element (20), made of a rigid material for example, extends over a sufficiently large area to provide support for the memory card (3, 31, 32) and to hold the latter away from the mainboard (C). As illustrated in particular in FIGS. 2A and 3A, the intermediate adapter element (20) can consist of an extension card equipped, for example, with securing resources placed on two opposite edges of the extension card and of conductors constituting the lines. The intermediate adapter element (20) can be rendered attached to the mainboard (C) or to a memory card (3, 31, 32). A memory card (3, 31, 32) can be designed, for example, with the connection interface fixed onto the body of the card (3, 31, 32) in a permanent manner.

The two plugs (251, 252) are identical and placed on either side of a median plane (P) of the connection interface. The plugs (251, 252) are, for example, co-planar and oriented in opposite directions to allow the connection of memory cards (3, 31, 32) positioned parallel to the median plane (P), as illustrated in particular in FIG. 5.

Figure 2A:
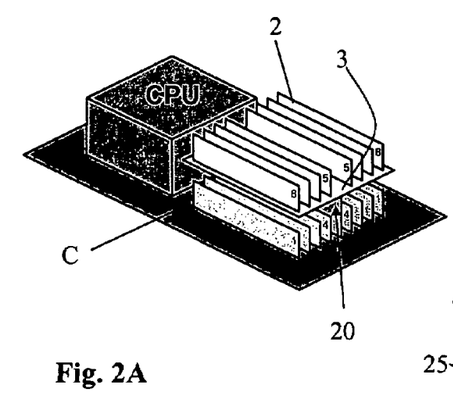
Figure 3A:
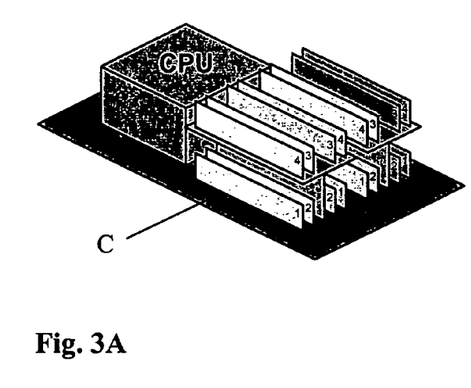
Figure 3B:
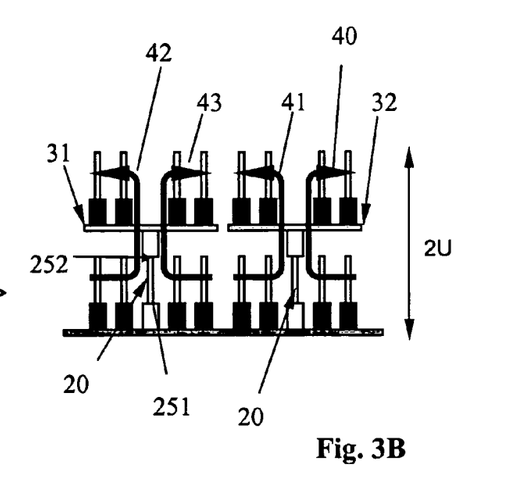

Referring to FIGS. 2A and 3A, a topology possible with the connection interface of the invention proposes to divide sixteen FBD modules over two height levels, in a superimposed manner. Advantage is therefore taken of the "lost" space (E) in the known arrangements as illustrated in FIGS. 6A and 6B. The mainboard (C) can then be equipped with nine slots (9 barrettes on the CPU card representing an area of 102 mm×160 mm). Such an arrangement extends over a height of 2 U (88.9 mm). The occupation of the mainboard (C) is then low—only half of the memory modules (2) are located on it.

Figure 2B:
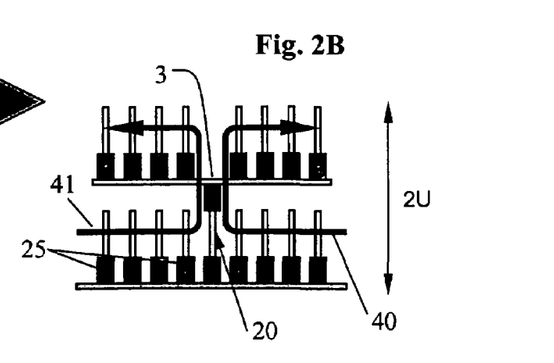

The accessibility of the memory modules (2) remains good, since it is from the top of the unit. The two channels (40, 41) which function with each other must have the same number of memory modules (2). When the memory capacity is increased, the free slots are filled in the order 1 to 8. When memory capacity is reduced, the FB-DIMM barrettes or similar modules are removed in reverse order (for continuity of the "daisy chain"). In the example of FIGS. 2A and 2B, changing slots 1 to 4 located on the mainboard (C) assumes that there is no memory at slots "5". In this case, memory card 3 can be removed (if it was installed) thus freeing access to the memory modules (2) of the mainboard with a processor (1). In contrast to a fixed system, the use of the connection interface of the invention confers a movable character on the memory card (3, 31, 32) equipped with its memory modules (2).

The most modest configuration is naturally less expensive when one does not want a memory card. In fact, the single additional cost comes from the FB-DIMM connector (23) which is provided to receive a plug (251) of the connection interface, and from the space that it occupies on the mainboard (C). The extension card with its plugs (51, 252) and the memory card (3, 31, 32) are not delivered in this case but can be acquired later. Moreover, the connection interface and the memory card (3) forming the optional part (30) have a minimum of logic layers. It also needs to be said that the invention allows an arrangement of the modules (2) of the FB-DIMM type barrettes in a manner which is similar to the fins of a radiator of the CPU unit, so that they are in the ventilation airstream.

It is clear that the number of connectors (25) of memory modules (2) can be increased in a flexible manner by virtue of the connection interface of the invention. Thus, eight additional connectors (25) are provided so as to install eight connectors in all per channel (40, 41) in the example of FIGS. 2A and 2B. On the same principle, when the mainboard (C) has four channels (40, 41, 42, 43), eight additional connectors (25) are provided in the example of FIGS. 3A and 3B so as to install four connectors in all per channel (40, 41, 42, 43). In this last case, two memory cards (31, 32) are superimposed on the mainboard (C).

Figure 4:
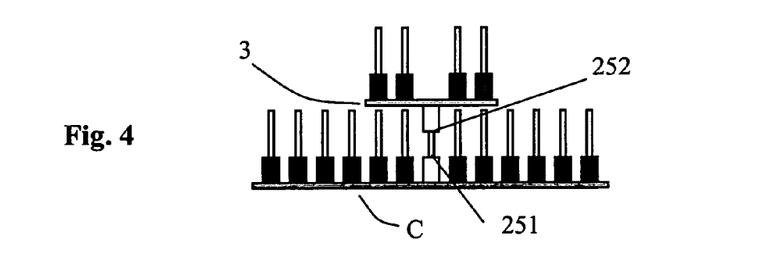
Figure 5:
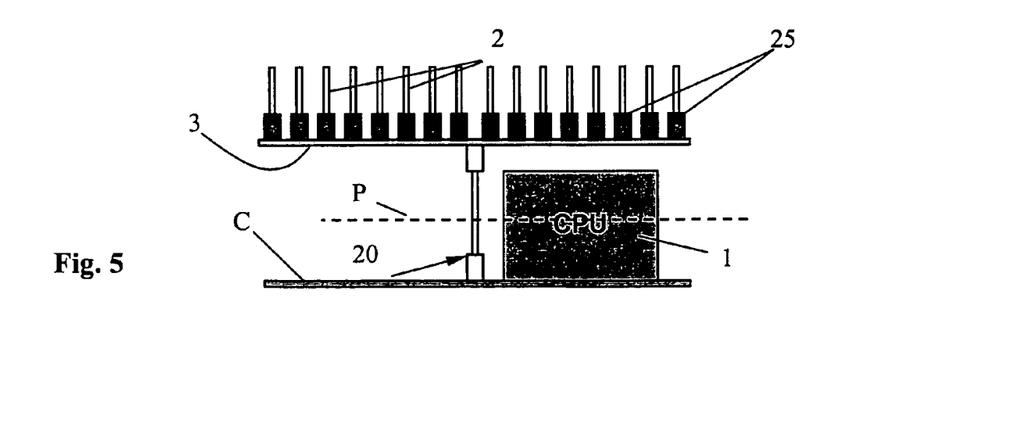

As illustrated in FIGS. 4 and 5, it is possible to use the connection interface with a mainboard (C) having no memory modules (2). All of the configurations in which extension cards with connecting plugs (251, 252) of the FDB type are placed between two successive connectors (23, 230) of the FB-DIMM type can be constructed (and not only with half of the "daisy chain").

It should be understood that the mainboard arrangement obtained in accordance with the invention is modulable, with this arrangement allowing the connection of one or more memory cards (3, 31, 32) of the type with two series of memory modules (2). As illustrated in FIG. 1, a mainboard that is fitted with at least one pair of FBD channels connected to the processor (1) advantageously includes one or more external linking connectors (23) of the FBD type provided to form a connection between the mainboard (C) and a daughter card. This connector (23) has two halves, each connected to a separate FBD channel.

In the example of FIGS. 1 to 4, the mainboard (C) includes connectors of the FBD type (25) provided to connect memory modules of the FBD type (2). These FBD connectors (25) are connected in series between the processor (1) of the mainboard (C) and the external linking connector (23), the connection being effected for each series by simple links from one of the channels (40, 41). In other words, each FBD connector (25) is interconnected between two parts of a given channel (40, 41). Each channel serving the first series of FBD connectors (25) emerges with another separate paired channel which serves the second series of FBD connectors (25) in the respective halves of an external linking connector (23). Each half of the external linking connector (23) includes a series of electrical contact pins connected to a channel on the mainboard (C). A series of electrical contact pins is designed to enter into contact with a corresponding series of electrical contact pins on the connection plug (251) of the FBD type on the interface used to connect the mainboard (C) to a daughter card.

It can be seen that the external linking connector (23) is particular, since it is connected to two separate channels (40, 41) on the motherboard, in contrast to the other connectors (25) used to connect the memory modules (2). Thus, this external linking connector (23) is used to associate the mainboard (C) with a connection interface that provides the connection to a memory card (3, 31, 32). The connection interface is inserted into the said external linking connector (23) by the first edge, with an opposite edge being inserted into a special connector (230) provided on the daughter card to connect to the mainboard (C). The special connector (230) of the memory card (3, 31, 32) is connected to two channels, equipped with a memory module or a series of memory modules (2) respectively.

As illustrated in FIGS. 1 to 5, the memory card (3, 31, 32) which can equip the mainboard (C) has channels of the memory card that are each connected to a linking module to another card, which happens to be the mainboard (C). In all, this linking module receives two distinct channels of the FBD type and includes the FBD type connector (230) which is specifically connected to the two channels. The special connector (230) includes two distinct series of electrical contact pins connected respectively to the two paired channels of the memory card (3, 31, 32). As shown in FIGS. 2B, 3B, 4 and 5, the memory card (3, 31, 32) includes two opposite faces, one of which supports connectors (25) of the FBD type to connect FBD memory modules (2), while the other face supports the connector (230) of the linking module. This special connector (230) is therefore oriented in an opposite manner to the other connectors (25) and can therefore take a connection interface of the extension card type for a mainboard (C). The linking module of the memory card (3, 31, 32) has conductor elements that are used to connect the channels of the card (3, 31, 32) to the special connector (230). It can be seen that in the memory card (3, 31, 32), each channel of the FBD type is linked to the connectors (25) of the FBD type by a daisy-chain arrangement, each of the channels having one end connected to the said linking module.

One of the advantages of the invention is the ability to put the memory modules (2) on daughter cards so as to optimise use of the mainboard area (a CPU board, for example) while allowing the daughter cards to be arranged in a compact manner. The advantage of using of connectors (25, 23, 230) of the standard FBD type and a connection interface with plugs of the FBD type, rather than a customized connector, is linked to the standardisation of the FB-DIMM connector, to the very large number that will therefore be manufactured(and by several competing suppliers) and therefore to very competitive prices.

It will be apparent to those skilled in the art that the present invention may be implemented in many other specific forms without moving outside the area of application of the invention as defined in the appended claims. Accordingly, it is not intended to limit the claims to the details described herein. Rather, the claims are intended to cover all forms of interface connections which fall within the true spirit and full scope of the claims presented herein.

The invention claimed is:

1. A connection arrangement for a computer unit for establishing connections between a mainboard and a memory card having memory module connectors, the memory module connectors for connecting any memory modules installed on the memory card, the connection arrangement comprising:
the mainboard having at least one processor wherein the mainboard is fitted with at least one pair of Fully Buffered Dual Inline Memory Module (FBD) channels connected to the processor,
the mainboard further including an external linking connector having two distinct series of electrical contact pins respectively connected to each of the pair of FBD channels provided on the mainboard,
the connection arrangement adapted to having a connection interface connectable to the external linking connector on the mainboard and providing for connection of the memory card to the pair of FBD channels of the mainboard and resulting in at least a pair of the memory modules when installed on the memory card being connected to the pair of FBD channels on the mainboard, thus enabling processor access to the installed memory modules of the memory card.

2. An arrangement according to claim 1, wherein the external linking connector is operatively associated with a the connection interface providing connection to a memory card.

3. An arrangement according to claim 1, wherein the connection interface connectable to the external linking connector on the mainboard includes:
a first and a second plug each compatible with the said external linking connector, each plug including two series of electrical contact pins, the first plug constituting a first connection resource adapted to be connected to the two channels of said pair of FBD channels of the mainboard through the external linking connector and the second plug constituting a second connection resource adapted to be connected to two channels of a pair of FBD channels of the memory card; and respective internal links connecting the first plug to the second plug and respectively connecting each channel of the pair of FBD channels of the mainboard with one respective channel of the pair of FBD channels of the memory card for providing processor access to the installed memory modules of the memory card.

4. A memory card for connection to a mainboard, the mainboard having at least one pair of Fully Buffered Dual Inline Memory Modules (FBD) channels connected to a processor, the memory card comprising:
at least a pair of FBD channels and two series of FBD memory module connectors connected to the respective FBD channels of the memory card by FBD connectors allowing the connection of fl~FBD memory modules, a linking module for connecting each FBD channel of the memory card to the mainboard, the linking module connected to two distinct FBD channels of the memory card, the linking module further including a connector having two distinct series of electrical contact pins, each series of pin respectively connected to said two distinct FBD channels of the memory card and wherein the connector of the linking module is adapted to be connected to a connection interface, connection interface establishing a connection to the mainboard and operatively coupling the processor through the pair of FBD channels to the installed memory modules on the memory card.

5. A memory card according to claim 4, said card having two opposite faces, one of which supports said FBD connectors to connect said FBD memory modules, and the other of which supports the connector of the linking module, and the linking module having conductor elements to connect the channels of the memory card to the connector of the linking module.

6. A memory card according to claim 4, which each FBD channel is connected to FBD connectors by a daisy-chain arrangement, each of the channels of the memory card having one end connected to the said linking module.

7. A memory card according to claim 4, further including a connection interface inserted in the connector of the linking module: the connection interface including two FBD plugs tat are compatible wit the said connector of the linking module, each plug being fitted with two series of electrical contact pins, a first of said two FBD plugs constituting a connection resource for connection to the two channels of the mainboard and a second of said plugs constituting a connection resource for connecting no the two channels of the memory card; and
respective internal links for connecting the first plug to the second plug and thus providing for connecting each channel of said pair of channels of the mainboard to a respective channel of said pair of FBD channels of the memory card.

8. A connection interface for a computer unit, and for the connection of a mainboard having at least one processor connected to a pair of Fully Buffered Dual Inline Memory Module (FBD) channels, with a memory card having a series of memory modules, the interface comprising: two FBD connecting plugs, each fitted with two series of electrical contact pins, each of the plugs adapted to be inserted into a two-way FBD connector,
wherein a first of said plugs constitutes a first connection resource for connecting to the two FBD channels of the mainboard, wherein a second of said plugs constitutes a second connection resource for connecting to two FBD channels of the memory card with said series of memory modules on the memory card divided between at least two channels; and further comprising respective internal links connecting the first plug to the second plug and establishing a path for the one processor to access the memory modules on the memory card through the two FBD channels.

9. The interface according to claim 8, further including at least one intermediate adapter element attached to the first plug and to the second plug, said adapter element supporting the memory card in a position away from the mainboard, while corresponding to the lengths of the internal links which connect the first plug to the second plug.

10. The interface according to claim 9, wherein the intermediate adapter element is an extension card of a mainboard and the internal links are printed circuit tracks.

11. The interface according to claim 8, wherein the two plugs are identical and placed on either side of a median plane of the connection interface.

12. The interface according to claim 8, wherein the two plugs are co-planar and oriented in opposite directions and the memory cards are positioned parallel to the median plane.

13. The interface according to claim 9, wherein the intermediate adapter element includes conducting lines connecting the two plugs.

14. The interface according to claim 9, wherein the intermediate adapter element is attached to a mainboard.

15. The interface according to claim 9, wherein the intermediate adapter element is attached to the memory card having said series of FBD memory modules divided between at least two channels.

16. The interface according to claim 8, wherein said internal links connect each of the channels of said pair of channels of the mainboard, with a respective channel of said pair of channels of the memory card.

17. An apparatus for use in a computer unit for connecting memory modules on a memory card to a mainboard, comprising:
a processor mounted on the mainboard;
first and second channels comprising a pair of channels on the mainboard, each said channel comprising logic lines of the daisy chain connection type;
an external linking connector attached to the mainboard, said external linking connector having first and second distinct series of electrical contact pins, each said series respectively connected to said first and second channels of the pair of channels on the mainboard and adapted for receiving an intermediate element for extension of the logic lines;
a connection interface providing for connection of the channels between the external linking connector and the memory card;
the memory modules on the memory card arranged in pairs and when connected to the mainboard has each of the pair connected to one of the pair of channels; and
wherein the processor utilizes the pair of said first and second channels extended through the connection interface to access said memory modules on the memory card.

18. The apparatus of claim 17, wherein each channel is terminated at each end by a terminator.

19. The apparatus of claim 18, wherein the channels support Fully Buffered Dual Inline Memory Modules (FBD).

20. The apparatus of claim 17, wherein the external linking connector is mounted so as to extend in a direction away from the mainboard, and the memory card lies in a plane substantially parallel to the mainboard when said memory card is attached to the connection interface and the connection interface is attached to the external linking connector thereby providing for improved compactness of the mainboard.

21. The apparatus of claim 17 wherein the memory card and mainboard are arranged with the memory card away from the mainboard, the arrangement providing for improved compactness of the mainboard.

22. The apparatus of claim 17, in which the memory card is removable.

23. The apparatus of claim 17 in which the arrangement of connectors and channels in the connection arrangement enables equal physical accessibility to each of any pair of memory modules connected to the pair of channels.

24. The apparatus of claim 20, in which the memory card having memory module connectors is removable.

25. The apparatus of claim 23, in which the memory card having memory module connectors is removable.

26. The connection arrangement of claim 1 in which the physical layout of the memory modules is arranged to provide equal physical accessibility to each of the pair of any number of pairs of memory modules connected to each pair of FBD channels.

* * * * *